(12) United States Patent
Crose

(10) Patent No.: US 11,198,388 B1
(45) Date of Patent: Dec. 14, 2021

(54) VEHICLE ALARM SYSTEM AND METHOD OF USE

(71) Applicant: Sidney L. Crose, Arlington, TX (US)

(72) Inventor: Sidney L. Crose, Arlington, TX (US)

( * ) Notice: Subject to any disclaimer, the term of this patent is extended or adjusted under 35 U.S.C. 154(b) by 0 days.

(21) Appl. No.: 15/694,271

(22) Filed: Sep. 1, 2017

Related U.S. Application Data

(60) Provisional application No. 62/382,406, filed on Sep. 1, 2016.

(51) Int. Cl.
| | |
|---|---|
| *B60Q 1/00* | (2006.01) |
| *B60Q 9/00* | (2006.01) |
| *H04N 5/232* | (2006.01) |
| *G08B 21/02* | (2006.01) |
| *B60N 2/00* | (2006.01) |

(52) U.S. Cl.
CPC .............. *B60Q 9/00* (2013.01); *B60N 2/002* (2013.01); *G08B 21/02* (2013.01); *H04N 5/23206* (2013.01)

(58) Field of Classification Search
None
See application file for complete search history.

(56) References Cited

U.S. PATENT DOCUMENTS

| | | | | |
|---|---|---|---|---|
| 6,922,147 B1 * | 7/2005 | Viksnins | ................ | B60N 2/002 180/272 |
| 7,170,401 B1 * | 1/2007 | Cole | ...................... | B60N 2/002 340/439 |
| 8,044,782 B2 * | 10/2011 | Saban | ................... | B60N 2/002 340/438 |
| 9,227,484 B1 * | 1/2016 | Justice | .................. | B60N 2/002 |
| 9,381,857 B1 * | 7/2016 | Arnold | .................. | B60Q 9/001 |
| 9,384,647 B1 * | 7/2016 | Arnold | .................. | G08B 21/02 |
| 9,741,224 B1 * | 8/2017 | Singh | .................... | H04W 4/008 |
| 9,845,050 B1 * | 12/2017 | Garza | ...................... | B60Q 9/00 |
| 2006/0273917 A1 * | 12/2006 | Rams, Jr. | ............... | B60N 2/002 340/667 |
| 2014/0253313 A1 * | 9/2014 | Schoenberg | ............. | B60N 2/28 340/457 |
| 2016/0339838 A1 * | 11/2016 | Diaz | ........................ | B60Q 9/00 |
| 2017/0043783 A1 * | 2/2017 | Shaw | ................. | B60H 1/00978 |
| 2017/0066406 A1 * | 3/2017 | Ricci | ..................... | B60R 25/102 |
| 2017/0116839 A1 * | 4/2017 | Friedman | ........... | G08B 21/0283 |
| 2017/0282791 A1 * | 10/2017 | Voorhies | .................. | B60Q 9/00 |

* cited by examiner

*Primary Examiner* — Julie B Lieu
(74) *Attorney, Agent, or Firm* — Leavitt Eldredge Law Firm

(57) ABSTRACT

A vehicle alarm system includes a vehicle having a frame; a driver seat secured to the frame; a back seat secured to the frame; and a computer configured to determine if the vehicle is in motion. The system further includes a pressure sensor secured to a driver seat and in data communication with the computer, the pressure sensor is configured to sense the pressure of a driver sitting on the driver seat; a thermometer sensor in data communication with the computer, the thermometer is configured to measure the outside and inside air temperature within the vehicle; a motion detector in data communication with the computer, the motion detector is configured to detect motion of an infant within a car seat secured to the back seat of the vehicle; a camera in data communication with the computer, the camera is configured to capture images of the infant; a transmitter in data communication with the computer; and a mobile device in wireless communication with the transmitter.

1 Claim, 3 Drawing Sheets

VEHICLE ALARM SYSTEM AND METHOD OF USE

BACKGROUND

1. Field of the Invention

The present invention relates generally to vehicle alarm systems.

2. Description of Related Art

Alarm systems for vehicles are well known in the art and are commonly used to transport children, infants, elderly persons, and pets. FIG. 1 depicts a simplified side view of a conventional vehicle 101 having a frame 103 and a door 105 pivotally attached to the frame 103. In FIG. 2, the inside of vehicle 101 is shown. As depicted, vehicle 101 includes a front seat 201, a rear seat 203, and in the exemplary embodiment, a child car seat 205 removably secured to rear seat 203 and configured to secure a child therein during transport. Vehicle 101 is further provided with a computer 207 conductively coupled to a horn 209 and a light 211. In the exemplary embodiment, light 211 could be the front headlights or a dashboard light.

It should be understood that excessive heat could cause illness or death to a child, infant, elderly person, and/or pet left behind in the closed vehicle. It is commonly known that drivers will forget about the child, infant, elderly person, and/or pet when exiting the vehicle. A locked vehicle exposed to the sun during hot summer days could result in serious physical injury.

Although great strides have been made in the area of gun targets, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
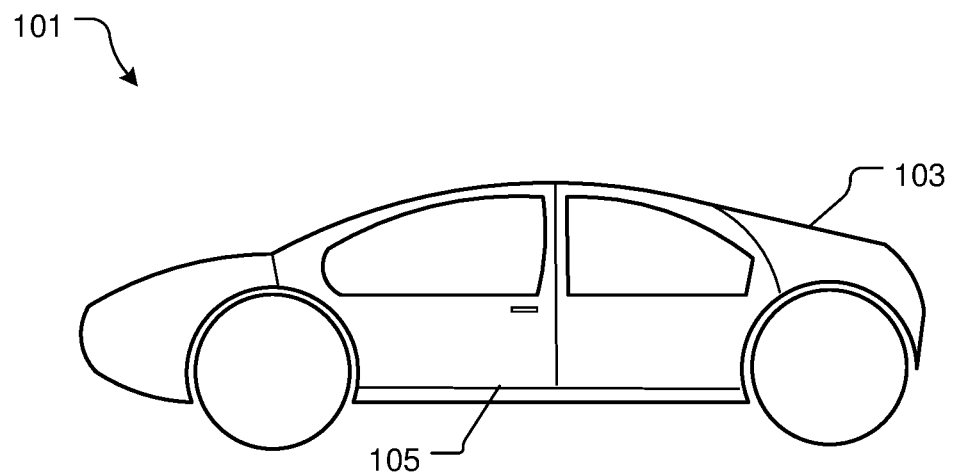
FIG. 1 is a side view of a conventional vehicle.
Figure 2:
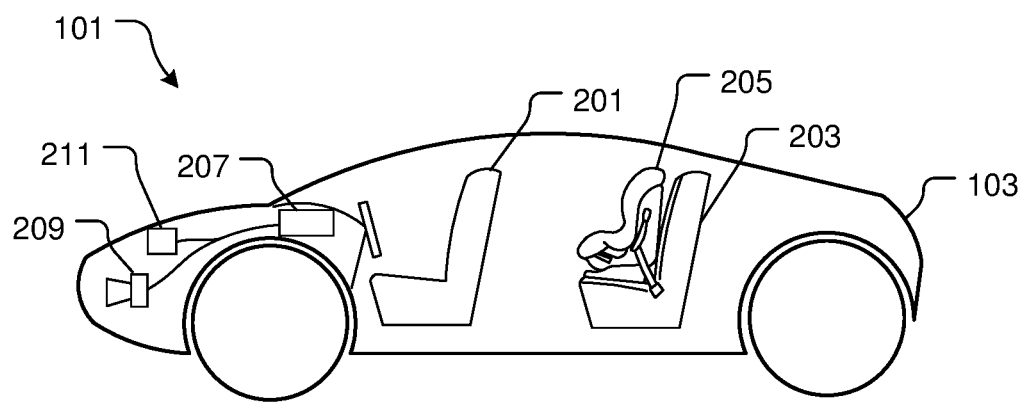
FIG. 2 is an inside view of the vehicle of FIG. 1.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional vehicles. Specifically, the alarm system of the present application is configured to provide rapid and effective means to notify the driver and/or other third party when a child, elderly person, pet or the like is left behind in a vehicle. Further, the system of the present invention is configured to receive photos via a mobile device in the event that a motion detector or infrared detector is activated. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 3:
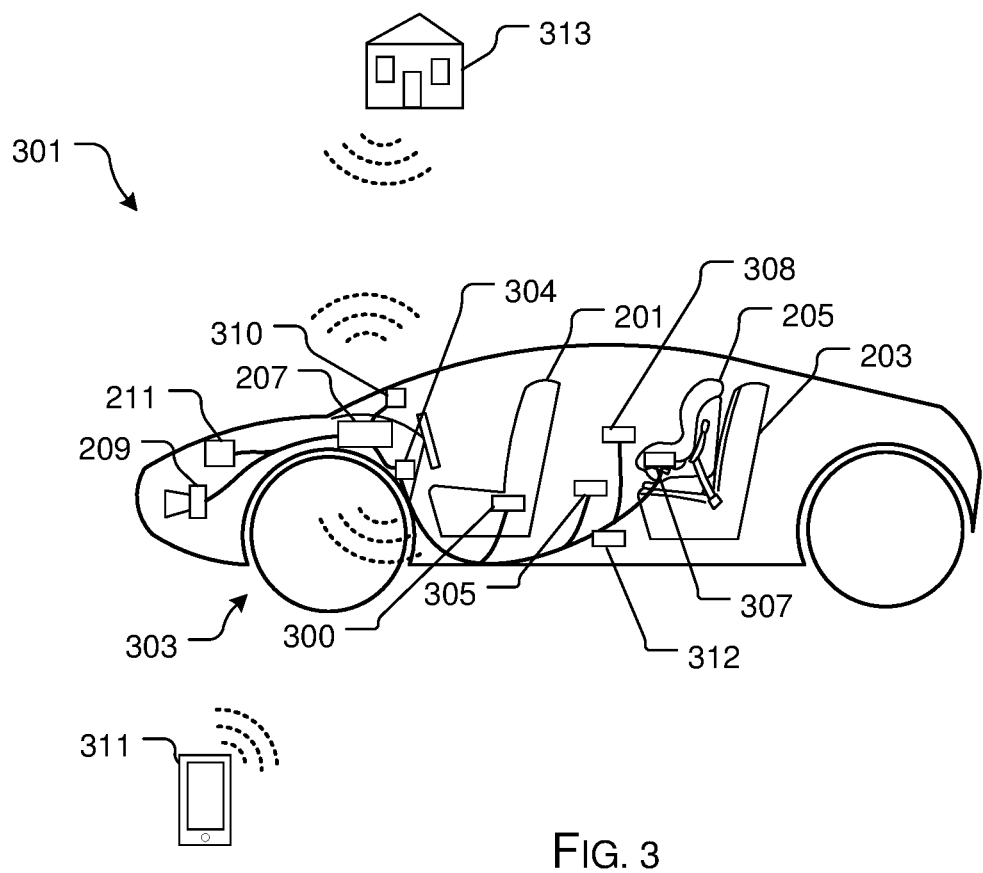
FIG. 3 is a simplified side view of a vehicle having an alarm system in accordance with a preferred embodiment of the present application.

Referring now to the drawings wherein like reference characters identify corresponding or similar elements throughout the several views, FIG. 3 depicts a simplified front view of a vehicle 301 in accordance with a preferred embodiment of the present application. It will be appreciated that vehicle 301 overcomes one of more of the above-listed problems commonly associated with the conventional vehicles.

In the contemplated embodiment, vehicle 301 includes an alarm system 303 adapted for use with the computer 207. Thus, system 303 could be a retrofit to existing vehicles 101 and/or manufactured with the various devices discussed herein. As depicted, vehicle 301 is substantially similar in form and function to vehicle 101 except for the added features of system 303.

System 303 includes a computer 304 preferably conductively coupled to vehicle computer 207. Thus, in the contemplated embodiment, the system computer 304 is in data communication with vehicle computer 207 and is configured to manipulate the horn 209 and/or light 211 during use.

System 303 is provided with one or more sensors 305, 307, and 308 preferably conductively coupled to a processor 401. In the contemplated embodiment, sensor 305 is operably associated with the side door 105, which in turn relays a signal to the processor 401 when the door 105 is opened or closed. Sensor 307 is operably associated with the car seat 205 and is configured to relay a signal to the processor 401 when a child is carried in the car seat 205. In the contemplated embodiment, the sensor 307 is a motion detection sensor and sensor 308 could be an infrared sensor. In one embodiment, it is also contemplated having a thermometer 312 configured to measure the inside and/or outside temperatures. The contemplated embodiment further includes a pressure sensor 300 secured to the driver seat of the vehicle and configured to determine the presence of a driver.

One of the points of novelty believed characteristic of the present invention is the use of a camera 310 operably associated with processor 401 and configured to take pictures and/or videos and transmit them to the remote device 311. In one method of use, the vehicle is locked and one or more sensors 305, 308, 305, and/or 312 activates the camera, which in turn captures images within the vehicle and transmits the images to the phone 311. The user then reviews the images to determine if a child is left behind in the vehicle and/or if a party has broken into the vehicle.

Figure 4:
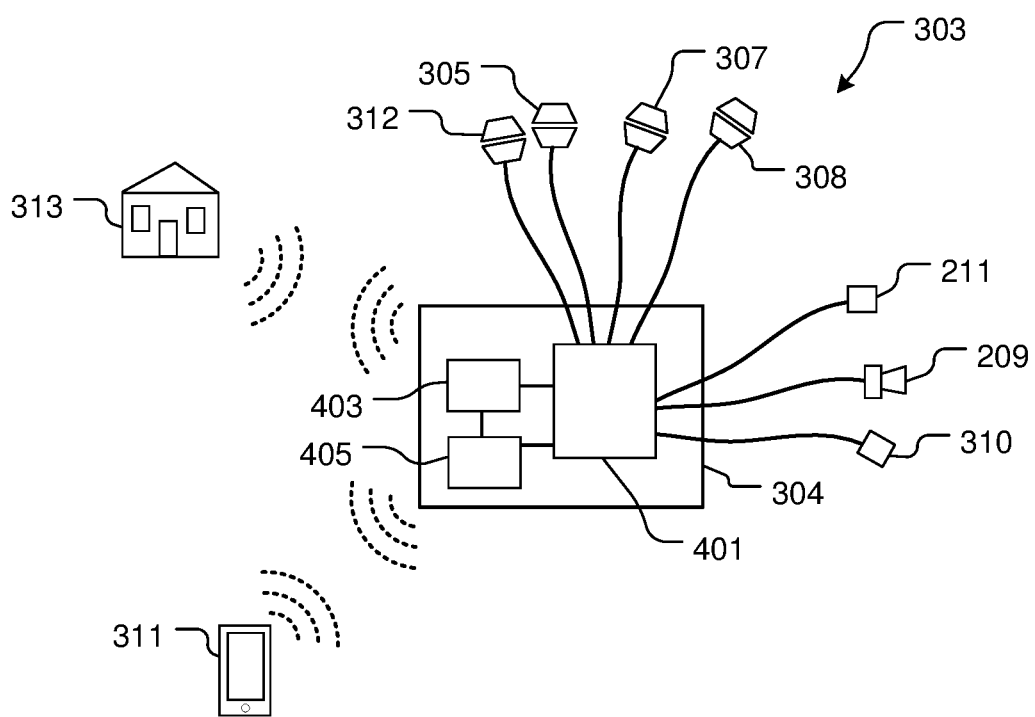
FIG. 4 is a simplified diagram of the alarm system of FIG. 3.

Referring now to FIG. 4, the processor 401 and the various sensors are used together to determine if a child is left behind in the car as the driver exits. It will be appreciated that system 303 is further provided with a range finder 403 and a transceiver 405 operably associated with processor 401. In the contemplated embodiment, transceiver 405 detects the presence of and relays a signal to a remote device 311 carried by the driver. In the exemplary embodiment, the remote device 311 is a phone configured to securely attach to the keys of the driver (not shown). The remote devices emits a signal, for example, one or more of a light, vibration or noise signal that can be seen, felt, or heard by the driver or third party. It will be appreciated that a mobile phone and/or other similar device could also receive the signal from transceiver 405. For example, a smartphone could include an application that receives and notifies the driver in the event that a child, elderly person, and/or dog is left behind. Such notifications could be a phone call, text message, ring tone, and the like.

In lieu of or in addition to sending a signal to the mobile device 311, it is also contemplated incorporating the features of system 303 with alerting third parties such as a police station via cellular communication. Thus, a police person, fireman, or medical personal can be notified via transceiver 405.

It should be understood that as the driver leaves the vehicle, the distance between the transceiver 405 and the mobile device 311 increases, thus limiting the type of signal that can be transmitted. Thus, it is contemplated using a range finder 403 configured to send a signal to the mobile device 311, and if no signal is received in return, to switch between a second stronger signal, as indicated in FIG. 5, and discussed more fully below.

One of the unique features believed characteristic of the present application is the ability to determine the presence of a child, elderly person, and/or dog in a locked car and to notify the driver and/or a third party in the event such situations occur. These features are achieved via sensors and notification devices on the car, via a mobile device carried by the driver, or notification to a third party.

Figure 5:
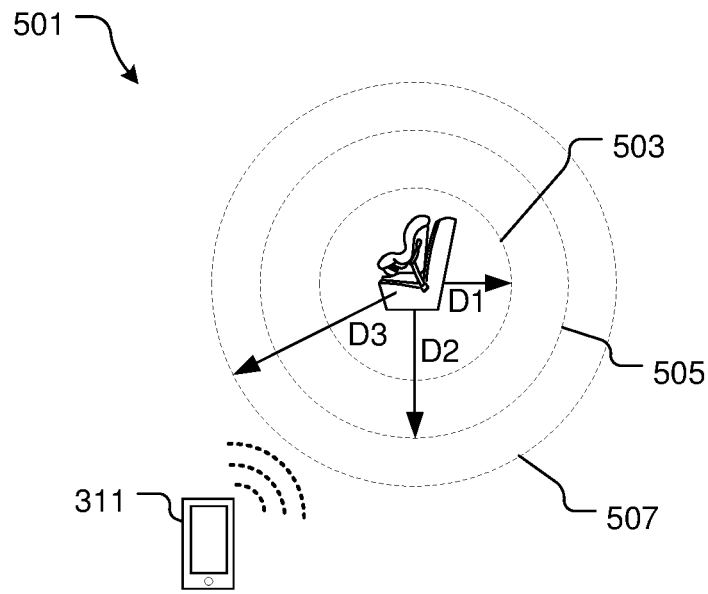
FIG. 5 is a simplified schematic of a signal range of the alarm system of FIG. 3.

In FIG. 5, the features of the range finder 403 is shown. The range finder 403 is configured to send a signal within a determined range 501 and to determined the distance the mobile device 311 is relative to the vehicle 301. As indicated by circles 503, 505, and 507, the respective distances D1, D2, and D3 requires the range finder 403 to switch between different signals types, for example, Bluetooth, WiFi, and/or GPS. Thus, the further the mobile device 311 from the vehicle, the higher powered signal is transmitted. The range finder is thus configured to determine the range distance of the mobile device via the transceiver 405 and processor 401.

Figure 6:
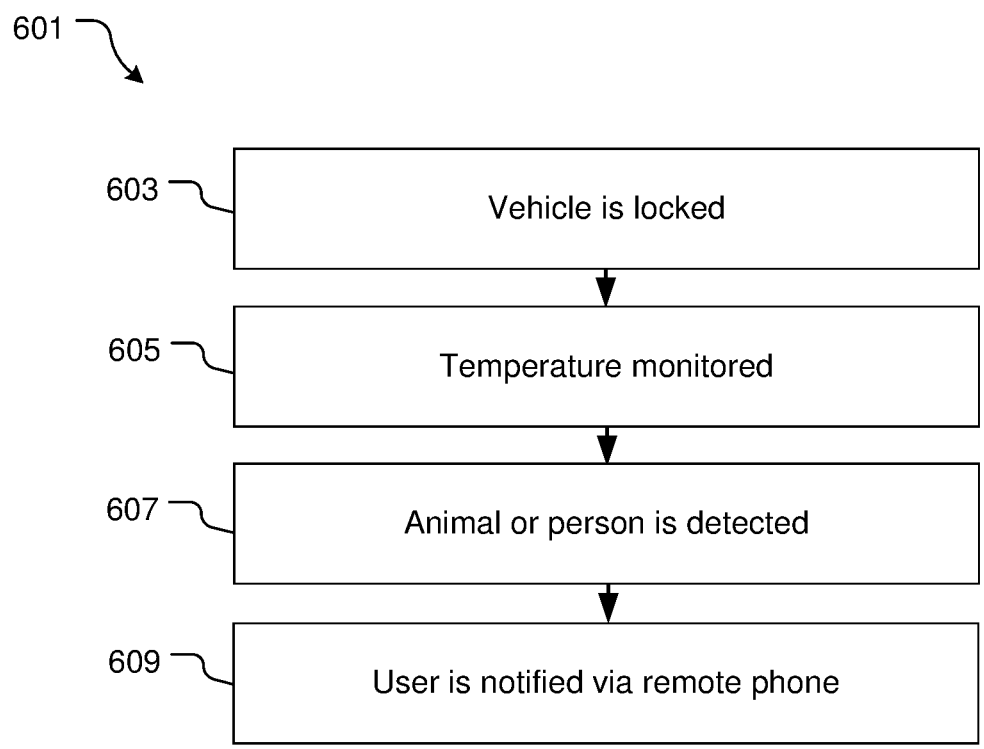
FIG. 6 is a flowchart depicting the preferred method of use.

Referring now to FIG. 6, a flowchart 601 depicts a preferred method of use including the process of locking the vehicle, monitoring the temperature within the vehicle, detecting an animal and/or party within the vehicle, and notifying the user via a remote device such as a phone. These steps are shown in boxes 603-609 in the drawings.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A vehicle alarm system, comprising:
   a vehicle having:
      a frame;
      a driver seat secured to the frame, the driver seat having a pressure sensor configured to detect the presence of a driver;
      a back seat secured to the frame;
      a computer configured to determine if the vehicle is in motion and in data communication with the pressure sensor; and
      an alarm in data communication with the computer;
   a thermometer sensor in data communication with the computer, the thermometer is configured to measure a change in temperature inside the vehicle;
   a motion detector in data communication with the computer, the motion detector is configured to detect motion of an infant within a car seat secured to the back seat of the vehicle;
   a camera in data communication with the computer, the camera is configured to capture images of the infant;
   a transmitter in data communication with the computer, the transmitter is configured to transmit one of the following signals:
      a Bluetooth signal;
      a WiFi signal; and
      a GPS signal;
   a mobile device in wireless communication with the transmitter; and
   a range finder in data communication with the computer and in wireless communication with the mobile device, the range finder is configured to determine the distance the mobile device is positioned relative to the vehicle, the range finder is configured to command the transmitter to transmit the one of the following signals upon determination of the distance of the mobile device relative to the vehicle, the range finder is configured to command transmitter to transmit a Bluetooth signal if the mobile device is a first predetermined distance, to transmit a WiFi signal if the mobile device is at a second distance, and a GPS signal if the mobile device is at a third predetermined distance;

wherein the computer relays images and temperature data to the mobile device via the transmitter only if all of the following conditions are met:
a. if the vehicle is not moving,
b. if motion is detected by the motion detector, and
c. if the pressure sensor detects that the driver has left;
if the following conditions are met, the car alarm is activated and a third party is wirelessly notified via the transmitter.

\* \* \* \* \*